United States Patent

[11] 3,572,609

[72] Inventor Roy G. R. Slawson
 Sylmar, Calif.
[21] Appl. No. 821,206
[22] Filed May 2, 1969
[45] Patented Mar. 30, 1971
[73] Assignee Lockheed Aircraft Corporation
 Burbank, Calif.

[54] STATIC DISCHARGED FROM JET AIRCRAFT
 8 Claims, 2 Drawing Figs.
[52] U.S. Cl. .................................................. 244/1,
 317/2
[51] Int. Cl. ...................................................... B64d 45/02
[50] Field of Search ........................................... 244/1, 1
 (R); 317/2, 2.4, 2.5, 2.6, 3

[56] References Cited
 UNITED STATES PATENTS
2,539,163 6/1951 Robinson .................... 244/1(R)X
3,035,208 5/1962 Clark .......................... 317/1(.4)

Primary Examiner—Milton Buchler
Assistant Examiner—Jeffrey L. Forman
Attorneys—George C. Sullivan and Ralph M. Flygare ABSTRACT: A static discharger for an aircraft is described which employs a stream of gas passing between and over spaced, charged electrodes on the aircraft. One of the electrodes is perforated and is located around the other of the electrodes. To obtain best performance the gas stream contains finely divided carbon or smoke particles.

Patented March 30, 1971 3,572,609

INVENTOR.
ROY G.R. SLAWSON
BY George C. Sullivan
Ralph M. Flygare
Agents

3,572,609

STATIC DISCHARGED FROM JET AIRCRAFT

BACKGROUND OF THE INVENTION

It is a matter of common knowledge that electrostatic charges accumulate on moving aircraft, the reasons for which are unimportant to an understanding of this invention. It is also a matter of common knowledge that the accumulation of such charges on such aircraft is disadvantageous, and various means have been proposed heretofore to substantially eliminate this effect. Many of such prior efforts in this field have involved the creation of a potential gradient between two different electrodes on an aircraft. One such device is disclosed in U.S. Pat. No. 2,539,163 to Robinson. It has been recognized that such two oppositely charged electrodes can serve to create a situation causing or tending to cause a static charge in moving aircraft to be discharged to at least a degree. The operation of such two electrodes normally to remove such an aircraft charge normally involves not only the effect of an electric field per se, but the various phenomena which normally occur adjacent to any two oppositely charged electrodes separated from one another by a gas.

It is considered that the various prior methods of removing a static charge from an aircraft suffer from one or more of a series of disadvantages and/or limitations. Certain of these methods are not considered satisfactory to remove an electrostatic charge from an aircraft. Some of these methods require specialized equipment which is or tends to be relatively expensive and at times relatively difficult to satisfactorily install in an aircraft. Various of these prior methods are considered to be unacceptable because of the high power consumption required to carry them out. It will be recognized that in certain cases there may be other objections to various prior procedures for removing a static charge from a moving aircraft.

SUMMARY OF THE INVENTION

An objective of this invention is to provide a new and improved way for discharging a static charge from a moving aircraft. From this is will be apparent that an objective of this invention is to provide a new and improved method for this purpose. Objectives of this invention are to provide a method of the type described; which may be easily and conveniently carried out; which requires the consumption of comparatively low power; which is effective for its intended purpose; and which can be easily and conveniently employed with a minimum of difficulty.

A further objective of this invention is to provide new and improved apparatus for removing the static charge on a moving aircraft. Other objectives of this invention are to provide apparatus for this purpose; which may be manufactured at a comparatively nominal cost; which may be easily and conveniently installed; which may be effectively utilized for the intended purpose; which consumes a comparatively minor amount of power; and which may be utilized over a prolonged period with a minimum amount of maintenance.

In accordance with this invention these objectives are achieved by providing on an aircraft a first electrode and a second electrode of a screenlike character surrounding and spaced from the first electrode. Means are provided on the aircraft for creating a voltage differential between these two electrodes; one of them is grounded to the body of the aircraft. Normally these electrodes will be located on the aircraft so that as the aircraft moves a gas will pass through the space between these two electrodes. Preferably either this gas shall be an exhaust gas of the aircraft containing a relatively large content of extremely finely divided carbon particles or means will be used with the electrodes so as to inject into and mix with the stream of gas flowing between and past them a quantity of such carbon particles.

During the operation of an aircraft provided with the structure described, the potential difference between the two electrodes employed will tend to create a plasma consisting of an assembly of ions, electrons, neutral atoms and neutral molecules. As the result of one of the electrodes being grounded to the body of the aircraft, an electrical imbalance will be created in the gas plasma in the vicinity of the electrodes as the aircraft is operated. The speed of the gas movement, in the vicinity of these electrodes will cause this electrically unbalanced plasma created to move into the space behind the aircraft as the aircraft moves. This in turn will result in the static charge on the aircraft being "bled" into the space behind the aircraft as the aircraft moves.

The electrons and ions in the plasma have a relatively high drift velocity and will normally tend to come together and neutralize one another comparatively rapidly. This effect would limit the effectiveness of the procedure described in this summary if extremely finely divided carbon particles such as smoke particles were not interjected into the space between the electrodes. Such particles are conductive and will pick up and carry electrons and many ions as a plasma is created in accordance with this invention. Because such particles have a relatively slow drift velocity they will not drift together until they are relatively far behind the aircraft. This improves the efficiency of the static discharge from the aircraft.

With the invention preferably the electrodes utilized are installed in the manifold of a jet engine on a jet-type aircraft. The exhaust gasses passing through such a manifold of an aircraft are normally at a sufficiently high temperature so that a relatively high degree of ionization may be achieved through the operation of the electrodes. This of course promotes overall efficiency. Further, the exhaust gasses from a jet engine normally contain a sufficiently high proportion of extremely finely divided carbon particles, so that these particles can serve as carriers for a relatively high proportion of the electrons and ions forming a part of the plasma created.

BRIEF DESCRIPTION OF THE DRAWINGS

Further details of this invention and the manner in which the various objectives of the invention are achieved will be apparent from a careful consideration of the remainder of this specification, the appended claims, and the accompanying drawing in which:

Figure 1:
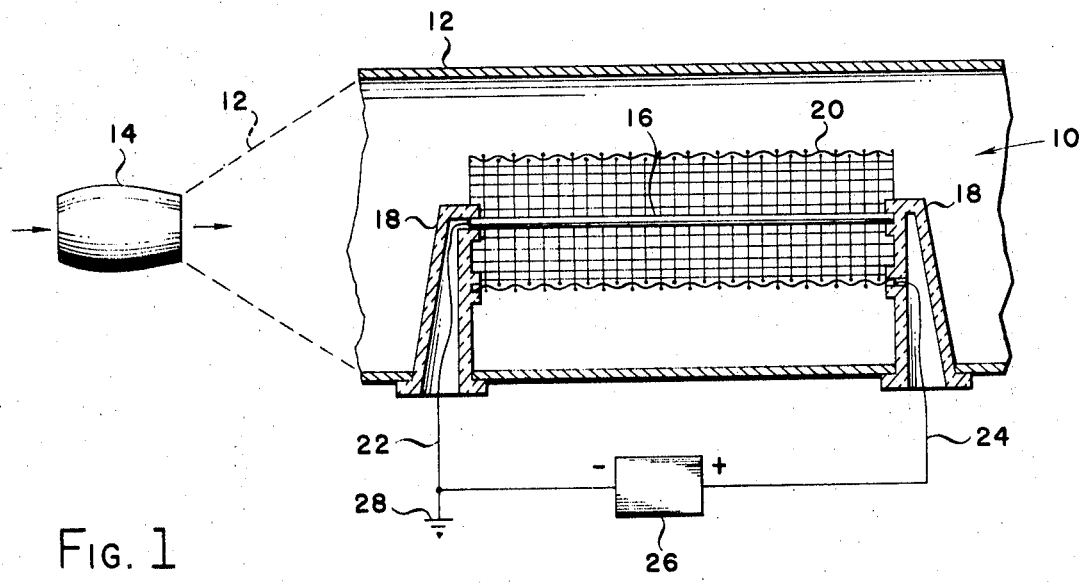
FIG. 1 is a diagrammatic cross-sectional view showing a presently preferred embodiment or form of the invention in use in the exhaust manifold of a jet engine on a jet aircraft.

The drawing is primarily intended to illustrate in a diagrammatic manner principal features of this invention. It will be realized that this invention can be embodied in various ways in different types of aircraft through the use or exercise of routine engineering skill on the basis of the disclosure of the drawing and of this application.

DETAILED DESCRIPTION OF THE PREFERRED EMBODIMENT

In FIG. 1 of the drawing there is shown an apparatus 10 for removing the static charge from an aircraft which is installed within an exhaust manifold 12 located immediately adjacent and to the rear of a diagrammatically indicated jet engine 14. This apparatus includes an elongated electrically conductive wire or rodlike first electrode 16 supported by support stands 18. This first electrode 16 is surrounded by a concentric, cylindrical, electrically conductive second electrode 20. This electrode 20 may be supported by the same support stands 18.

It will be noted that the support stands 18 illustrated are hollow so that electrical connection may be made to the electrodes 16 and 20 through the use of electrically conductive wires 22 and 24. These wires 22 and 24 are connected to a conventional direct current voltage generator 26 mounted within the body of the aircraft upon which the apparatus 10 is installed. The wire 22 is grounded to this aircraft body by an appropriate ground connection 28 as shown. It will be realized, of course, that such an aircraft body is normally electrically conductive.

The voltage generator 26 employed may be of any conventional construction capable of creating a relatively high DC potential. Thus, a conventional oscillator and rectifier generator may be used. The generator 26 employed should be capable of creating a voltage of at least 5,000 and preferably up to about 10,000 volts.

The operation of the apparatus 10 is essentially relatively simple. As the aircraft upon which this apparatus is mounted is operated a stream of exhaust gas (or gasses) will be emitted from the engine 14 through the manifold 12. A part of this stream will flow between the electrodes 16 and 20 before being discharged from the manifold 12 and the remainder of this stream will flow around these electrodes 16 and 20 to the rear of the aircraft. Thus, this gas will flow in the vicinity of these electrodes. During such flow the voltage generator 26 will be operated so as to create a potential differential of preferably at least 5,000 volts between them. The voltage used should not be high enough so as to cause actual scintillation between these electrodes 16 and 20.

As a result of this potential applied to the electrodes 16 and 20 electrons will tend to move from the electrode 16 in the exhaust gas stream towards the electrode 20 and various ions will be caused to form. This will have the effect of creating in the exhaust gas stream what is referred to herein as a plasma. As the aircraft moves and such stream moves through the manifold 12 with the structure shown such as plasma as created will be moved generally away from the aircraft. Since the electrode 16 is grounded to the body of the aircraft this will result in the dissipation from the body of the aircraft of the excess of electrons which normally compose the electrostatic charge generated on this body as the result of aircraft movement.

An important aspect of the present invention is the control of the electrons which are emitted from the electrode 16. It will of course be recognized that such electrons move relatively rapidly. As a result of this, unless electron movement is controlled the efficiency of the apparatus 10 is not as great as desired. Such control is preferably accomplished in accordance with this invention by forming the second electrode 20 in the form of a perforate inert metal sheet shaped as cylinder or in the form of a cylinder of an inert metal wire screen material. The dimensions of the openings in such a second electrode 20 are considered to be relatively unimportant. Satisfactory results can be achieved by making such dimensions approximately the same as the dimensions used for the openings in screens used in vacuum tubes.

With this type of structure the electrons emitted from the first electrode 16 will tend to flow towards and to some extent through the second electrode 20. Because of the polarity of this electrode 20, they will tend to be "held" in a relative sense for a comparatively short time interval in the vicinity of this second electrode 20 on both sides of it. Further, some electrons may also tend to move towards the second electrode 20 from the interior of the manifold 12. The net effect of these results will be that the second electrode 20 will be surrounded by a cloudlike concentration of electrons and to some extent ions created during operation of the apparatus 10. This is considered to improve the ability of the exhaust stream from the engine 14 to tend to pick up and carry ions and electrons towards the rear of the aircraft. This invention uses another feature to obtain a greater improvement in operation than is achieved by this alone. This involves the use of finely divided conductive particles. The exhaust gasses from a jet engine used in such aircraft are different from the exhaust gasses of other normally functioning engines because of their high carbon content. Thus, for example, a common type of commercial jet engine is considered to give off 1.57 pounds of carbon per hour under takeoff type of operation conditions and a lesser amount under normal operating conditions. Of this amount of carbon 1.53 pounds is in the form of what may be considered smoke particles varying from 0.45 to 25 microns in diameter and the remainder is in the form of particles ranging from 25 to 800 microns in diameter.

During the movement of such carbon particles, and in particular those particles of 25 microns or less characterized by smoke particles, through the manifold 12 from the engine 14 of these particles will tend to collide with the electrons and ions surrounding the apparatus 10 and moving between the electrodes 16 and 20. As this occurs such electrons and ions will be "picked up" by these smokelike carbon particles so as to be carried by them. The exact physical phenomenon involved in the holding of such electrons and ions by the carbon particles is considered to be unimportant as far as the operation of this invention is concerned.

It will be recognized that electrons and ions held by carbon particles cannot drift in the same manner as if they were not held in such particles. To the extent that smokelike carbon particles possess a drift velocity in a gas stream such as the exhaust in the engine 14 such drift velocity is significantly slower than the drift velocity of unattached or uncarried electrons and ions under comparable conditions. As a result of this the electrons and ions carried by the exhaust stream from a jet aircraft engine 14 past the apparatus 10 will tend to recombine relatively slowly, and to the extent that such recombination occurs, it will be well to the rear of the aircraft because of the aircraft motion and because of the flow of the exhaust gasses from the aircraft.

As opposed to this, if the ions and electrons were not carried by carbon particles as described they would tend to drift together so as to neutralize one another much more rapidly than they do when supported by carbon particles as herein described. This would tend to have the effect of decreasing the charge dissipation from the body of the aircraft since such neutralization and drifting together of unattached electrons and ions would occur much closer to the aircraft body than when such ions and electrons are carried by particles as herein described.

The utilization of the apparatus 10 in the exhaust manifold 12 from a jet aircraft engine 14 is considered to achieve another significant advantage. In general the higher the temperature of a gas passed between two oppositely charged electrodes the greater the degree extent to which a plasma may be formed in such a gas. It is well known that the exhaust gases from a jet aircraft engine are relatively hot. As a result of this, during the use of the apparatus 10 a greater proportion of electrons and ions can be placed in such a gas stream by the formation of a plasma that would be possible if the apparatus 10 was used with a gas at a normal ambient temperature.

It is considered that a satisfactory apparatus 10 can be formed with both of the electrode 16 and 20 from about 5 to about 15 inches long. If these electrodes are shorter than this 5-inch figure it is considered that there will be inadequate opportunity for the formation of a plasma of the desired type having a relatively high content of electrons and ions. On the other hand it is considered that if the electrodes 16 and 20 are longer than this 15-inch figure that no significant benefits will be obtained through the operation of the apparatus 10. The reasons for this tend to be relatively complex and are not considered important to an understanding of this invention. They relate to the rate that ions and electrons will tend to recombine or be discharged in an electric field and other factors.

It is also considered that a satisfactory apparatus 10 can be created with the two electrodes 16 and 20 spaced from about 1 to about 3 inches apart. If these electrodes are too close there is a tendency for scintillation or arcing to occur between them at the voltages necessary to create a plasma. If they are too close together a satisfactory electron stream is considered impossible to obtain. On the other hand if these two electrodes 16 and 20 are further than about 3 inches apart it is considered that what has been referred to in the preceding as the ability of the electrode 20 to "hold" electrons in a cloudlike area will be interferred with and that the benefits from the use of this perforated electrode 20 will be detrimentally affected.

Figure 2:
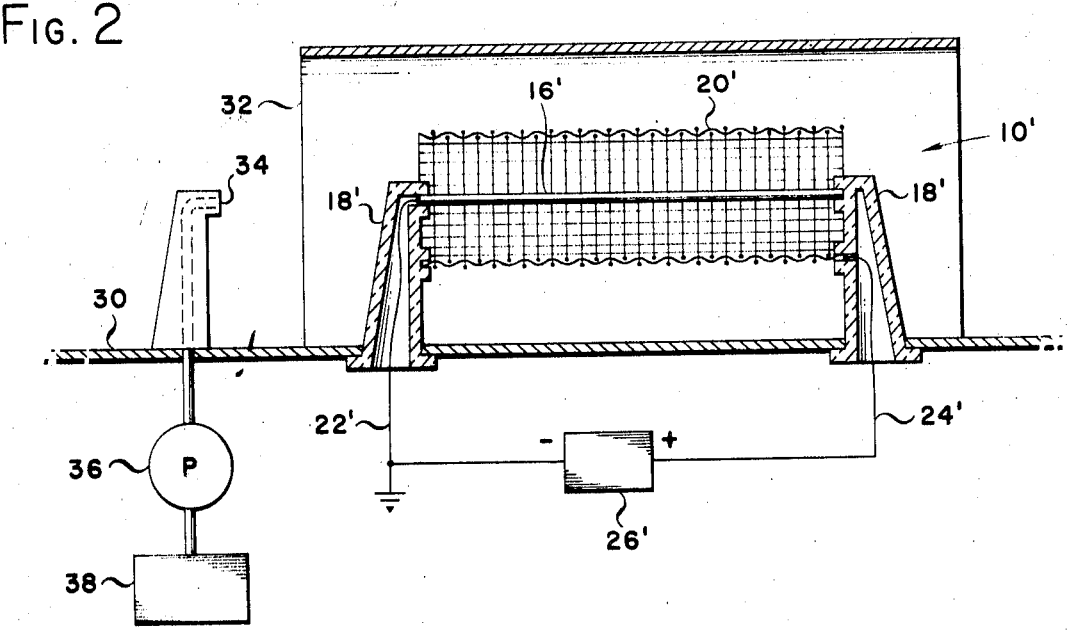
FIG. 2 is a view similar to FIG. 1 showing a modified form of this invention in use on the body of an aircraft.

FIG. 2 of the drawing is a view of the modified form of this invention in use directly upon the body 30 of an aircraft, and not in an engine manifold on such an aircraft. This modified form of the invention utilizes an apparatus 10' which is identical to the apparatus 10 previously described. In the interest of brevity these parts of the apparatus 10' which are the same as parts of the apparatus 10 are not separately indentified herein and are designated by the primes of the numerals previously used to designate such parts. If desired a cowling 32 in the nature of an air shield may be located around the apparatus 10' so as to ensure the smooth airflow past it during the movement of the aircraft body 30.

With this modified device a small nozzle 34 is located directly in front of the apparatus 10'. This nozzle 34 is connected to a conventional pump 36 which is designed to pump finely divided smokelike carbon particles from a reservoir 38 to in front of the apparatus 10' during aircraft operation. If desired, because of the particular equipment utilized the reservoir 38 may be fluidized in accordance with conventional practice so as to form a fluidized bed which may be easily handled by the pump 36.

The operation of the structure shown in FIG. 2 is essentially identical to the operation of the structure shown in FIG. 1 except for one feature. As the aircraft upon which this modified form of this invention is installed is moved a forward direction, a small quantity of carbon particles is dispensed through the operation of the pump 36 and the nozzle 34 so that this quantity flows past the apparatus 10'. During such flow, the normal gas movement will normally tend to dispurse the carbon particles so that they will serve the same function as the carbon particles conveyed in a jet aircraft exhaust.

In order to achieve this result, these carbon particles used with this modified form of the invention should be of 25 microns or less diameter. The quantity of such particles may be easily regulated by regulating the pump 36 in accordance with the charge on the aircraft to be removed. In general, the higher the charge the greater the quantity of particles which should be ejected from the nozzle 34.

If for any reason it is found that a particular jet aircraft engine does not emit a sufficient quantity of smokelike particles to satisfactorily remove a static charge from the aircraft using the apparatus 10, it is possible to utilize with this aircraft an arrangement of the nozzle 34, the pump 36, and the reservoir 38 so that the nozzle 34 is located in the manifold 12 between the apparatus 10 and the engine 14. The use of such a nozzle 34 in this manner is not normally considered necessary. Many other similar variations may be made in the structures herein indicated through the use of routine engineering skill in order to adapt the invention for use on various different aircraft. For this reason the invention is to be considered to be limited solely by the appended claims forming a part of this disclosure.

I claim:

1. An aircraft static discharge apparatus for use on the body of an aircraft which comprises:
   a first rodlike electrode;
   a second perforate electrode located concentrically around said first electrode;
   said electrodes being located on said aircraft where a stream of gas will pass between and over them during the operation of said aircraft; and
   means for oppositely charging said electrodes located on said aircraft body and connected to said electrodes.

2. An aircraft static discharge apparatus as claimed in claim 1 wherein said apparatus is mounted within the exhaust manifold of a jet aircraft engine on said aircraft body.

3. An aircraft static discharge apparatus as claimed in claim 2 wherein:
   said electrodes are both from about 5 to about 15 inches long; and
   said second electrode is spaced from said first electrode a distance of from about 1 to about 3 inches.

4. An aircraft static discharge apparatus as claimed in claim 3 wherein said means for charging is capable of placing a potential differential on said electrodes of at least 5,000 volts.

5. An aircraft static discharge apparatus as claimed in claim 1 including means for locating finely divided carbon particles in the gas which passes between and over said electrodes during the operation of said aircraft, said means for locating being located on said body of said aircraft.

6. An aircraft static discharge apparatus as claimed in claim 5 wherein:
   said electrodes are both from about 5 to about 15 inches long; and
   said second electrode is spaced from said first electrode a distance of about 1 to about 3 inches.

7. An aircraft static discharge apparatus as claimed in claim 6 wherein said means for charging is capable of placing a potential differential on said electrodes of at least 5,000 volts.

8. A method for discharging a static charge from the body of an aircraft which comprises creating a gas plasma in a stream of gas moving past said aircraft body by passing said stream of gas between spaced concentric, oppositely charged electrodes, the outermost of said electrodes being perforated, and injecting finely divided carbon particles into said stream of gas prior to passing said stream of gas between said electrodes.